(12) United States Patent
Yuan et al.

(10) Patent No.: US 9,268,897 B2
(45) Date of Patent: Feb. 23, 2016

(54) METHOD FOR INCREASING THE ROBUSTNESS OF A DOUBLE PATTERNING ROUTER USED TO MANUFACTURE INTEGRATED CIRCUIT DEVICES

(75) Inventors: Lei Yuan, Sunnyvale, CA (US);
Hidekazu Yoshida, San Jose, CA (US);
Youngtag Woo, San Ramon, CA (US);
Jongwook Kye, Pleasanton, CA (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 148 days.

(21) Appl. No.: 13/465,909

(22) Filed: May 7, 2012

(65) Prior Publication Data

US 2013/0298089 A1  Nov. 7, 2013

(51) Int. Cl.
*G06F 17/50* (2006.01)

(52) U.S. Cl.
CPC ........ *G06F 17/5077* (2013.01); *G06F 2217/12* (2013.01)

(58) Field of Classification Search
None
See application file for complete search history.

(56) References Cited

U.S. PATENT DOCUMENTS

| | | | |
|---|---|---|---|
| 6,066,180 A * | 5/2000 | Kim et al. | 716/55 |
| 8,239,806 B2 * | 8/2012 | Chen et al. | 716/126 |
| 8,245,174 B2 * | 8/2012 | Cheng et al. | 716/126 |
| 8,782,586 B2 * | 7/2014 | Sezginer et al. | 716/126 |
| 2011/0014786 A1 * | 1/2011 | Sezginer et al. | 438/618 |
| 2011/0023002 A1 * | 1/2011 | Cheng et al. | 716/126 |

* cited by examiner

*Primary Examiner* — A. M. Thompson
(74) *Attorney, Agent, or Firm* — Ingrassia Fisher & Lorenz, P.C.

(57) ABSTRACT

A process for manufacturing integrated circuit devices includes providing a set of original color rules defining an original color rule space and defining a design space. The improvement involves applying a perturbed color rule space to the router processing engine to expose double pattern routing odd cycle decomposition errors, and reconfiguring the router processing engine in accordance with the exposed decomposition errors.

18 Claims, 5 Drawing Sheets

METHOD FOR INCREASING THE ROBUSTNESS OF A DOUBLE PATTERNING ROUTER USED TO MANUFACTURE INTEGRATED CIRCUIT DEVICES

TECHNICAL FIELD

The present invention generally relates to methods for qualifying a router for use in the manufacture of integrated circuit devices, and more particularly relates to methods that include exposing and mitigating double patterning odd cycle decomposition errors in integrated circuit design layouts.

BACKGROUND

There is a continuing trend within the microelectronics industry to incorporate more circuitry having greater complexity on a single integrated circuit (IC) chip. Maintaining this trend generally entails shrinking the size of individual devices within the circuit by reducing the critical dimensions (CDs) of device elements along with the pitch (the CD of such an element plus the spacing between elements). Microlithography tooling and processing techniques play an important role in resolving the features necessary to fabricate devices and, accordingly, are continually under development to meet industry milestones relating to the CD and pitch characteristic of each new technology generation.

High numerical aperture (NA) projection stepper/scanner systems in combination with advanced photoresist processes now are capable of routinely resolving complex patterns that include isolated and dense resist features having CDs and pitches, respectively, well below the exposure wavelength. However, to meet the requirements of device design rules which continue to push the resolution limits of existing processes and tooling, other more specialized techniques have been developed to further enhance resolution. These include double patterning technology (DPT) techniques in which device patterns having potentially optically unresolvable features are decomposed into two or more complementary, and more easily resolvable patterns, each containing features with larger CDs and/or a relaxed pitch.

A router is an electronic design automation (EDA) tool used to convert logical designs into manufacturable layouts, and to connect the physical devices in the layout with metal lines. In DPT processes, a double patterning compliant router may be configured with a processing engine, including appropriate software, to decompose patterns and features into separate patterns, with each pattern being implemented in its own mask. In order to comply with manufacturing requirements, each pattern must satisfy its own single patterning rules, also called "same mask rules" or "same color rules", that is, a set of rules defining the limit of single pattern resolution for critical dimensions manufacturable by the foundry.

The same color rules are also called color rules for simplicity. A typical same color rule set includes minimum spacing requirements for tip-to-tip, tip-to-side, and side-to-side critical dimensions. The same color rules are determined by the manufacturing technology used by the foundry.

In accordance with a typical IC manufacturing process, if a particular design input includes two structures or features which result in a layout in which the two features are spaced apart by less than the CD specified in the color rule space, the router ensures that the generated routing structures can be decomposed into two masks, where the space between each pair of structures in the same mask is equal to or larger than the critical spaces specified by the same color rules.

Double patterning technologies necessitate a zero odd cycle requirement on double patterning routing layouts rendered by DPT compliant routers in order to ensure the manufacturability of the underlying IC designs. To accomplish this, a router must be capable of generating a decomposable layout for all IC design components and features. Ideally, a DPT compliant router should theoretically be qualified for every possible design configuration for each color rule set.

As a practical matter, routers are typically qualified, or stress tested, based on a specified color rule space and a specified design space. In this context, the term "color rule space" typically refers to a set of color rules associated with a particular manufacturing technology or methodology, and includes a specific numerical value for each color rule parameter such as tip-to-tip spacing, side-to-side spacing, and other critical physical dimensions. The term "design space" refers to a limited set of predetermined test designs useful in assessing the robustness of a router's DPT compliance and decomposition processing software and architecture.

When a router's processing engine generates (or "exposes") decomposition errors during the qualification, the errors are fed back to the development team to reconfigure the processing engine until an odd cycle clean output condition is achieved; that is, until application of the color rule space to the design rule space yields zero odd cycles (decomposition errors). However, given the relatively limited scope of the design space vis-à-vis the universe of possible design configurations encountered in the ordinary course of manufacturing IC devices, the confidence level associated with presently known router qualification processes is unsatisfactorily low.

BRIEF SUMMARY

Methods are provided for increasing the robustness of a double patterning router used in the manufacture of integrated circuit devices. The method includes providing a set of original color rules defining an original color rule space, providing a set of integrated circuit (IC) test designs defining a design space, perturbing the original color rules to define a perturbed color rule space, providing a router having a processing engine, and applying the perturbed color rule space and said design space to the router processing engine.

The method further includes processing the perturbed color rule space and the design space to expose double pattern routing odd cycle decomposition errors, and feeding back the decomposition errors to the router processing engine and reconfiguring it in accordance with the decomposition errors.

In an embodiment the set of IC test designs include at least one predetermined logical design for an integrated circuit, wherein the logic design only contains logic relationships; there is no physical information in the logic design.

The method further includes identifying at least one pattern that is non-compliant with double patterning technology, and wherein the color rules include a target critical value for at least one of a: side-to-side dimension; tip-to-side dimension; and tip-to-tip dimension.

In an embodiment, the step of perturbing may include, for each one of the target critical values, providing a plurality of expanded values which are at least one of: successively incrementally larger and successively incrementally smaller than each respective target critical value. The target critical values may be expressed in integer values of nanometer units. In an alternate embodiment, the plurality of expanded values are both greater than and less than the target critical value. In a further embodiment, the plurality of expanded values are expressed in successive increments of two integers.

In various embodiments, the router processing engine includes a computer processor and associated software configured to implement the function of an electronic design automation tool for generating routing patterns, and the task of reconfiguring may include revising the software to resolve the exposed decomposition errors.

The method further includes using the double patterning router to generate a physical design layout which does not include odd cycle decomposition errors. The method may also include manufacturing an integrated circuit device based on said design layout.

In accordance with yet another embodiment, a method is provided for fabricating an integrated circuit device using a double patterning router, the method including providing a set of original color rules defining an original color rule space, providing a set of integrated circuit designs defining a design space, and perturbing the original color rules to define a perturbed color rule space.

The method further involves processing, using the double patterning router, the perturbed color rule space and the design space to expose double pattern routing odd cycle decomposition errors, feeding the decomposition errors back to the router, and reconfiguring the router to correct the decomposition errors. The method continues by generating a design layout which does not include odd cycle decomposition errors, and manufacturing an integrated circuit device based on the design layout.

According to further embodiments, an integrated circuit device may made by any or all of the methods disclosed herein. In yet another embodiment, a double patterning router for use in manufacturing an integrated circuit device includes a data input module, a display module, and a processor module, wherein: the data input module is configured to receive data representing a design space and data representing an original color space; the processor module is configured to perturbate the original color rules to produce a perturbed color rule space, to process the design space and the perturbed color rule space, and to expose odd cycle decomposition errors resulting therefrom; and the display module is configured to graphically illustrate the decomposition errors

BRIEF DESCRIPTION OF THE DRAWINGS

The present invention will hereinafter be described in conjunction with the following drawing figures setting forth various aspects of the present disclosure, wherein like numerals denote like elements, and wherein.

for the router qualification in foundries, wherein the procedure 706 serves as an enhanced stress test. If a color clean result (no odd cycle) is obtained for 706, then the router is qualified and can be used by foundries to manufacture customer designs)

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

This disclosure presents a novel methodology for enhancing the robustness of a double patterning router through the use of color rule perturbation. As such, the methodology presented herein exposes a greater number of odd cycle decomposition errors than would otherwise be exposed through stress testing using only static target color rule values. The proposed methodology introduces a double patterning technology (DPT) compliant router with enhanced robustness that can easily be integrated into existing DPT-compliant design flows.

Figure 1:
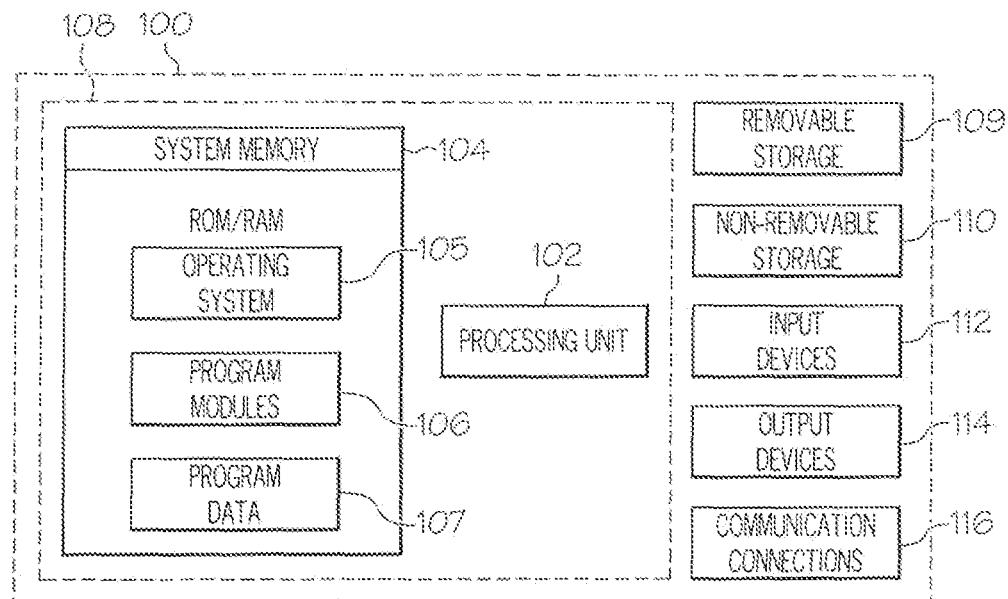
FIG. 1 is a functional block diagram that illustrates a computing device that may be used in implementations of the present invention.

The embodiments described herein can be implemented on a computing or processing system associated with a double patterning router or router system. FIG. 1 is a functional block diagram that illustrates the processing, computing, input/output (I/O), and display components of a processing system which cooperates with a router that may be used in implementations of the present invention. Processing infrastructure 100 typically includes at least one processing unit 102 and system memory 104 within which the router functionality is distributed. In this context, the router is that portion of the processing infrastructure which functions as a software tool for converting a logic design into a physical layout that can be manufactured.

Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line defining a processor module 108. In an embodiment, processor module 108 may be configured to implement the functions of an electronic design automation decomposition tool. As is known in the art, such a tool is capable of reading input design information, and rendering a DPT compliant layout which satisfies color rules embodied in the processing module. In the event decomposition odd cycle errors, are exposed, they may be graphically displayed, tabulated, or otherwise reported to the router operator and/or development personnel via one or more output devices 114.

Router 100 may have additional features or functionality. For example, router 100 may also include additional data storage devices (removable and/or non-removable) such as, for example, magnetic disks, optical disks, or tape. Such additional storage is illustrated in FIG. 1 by removable storage 109 and non-removable storage 110.

Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of router 100.

Router 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Router 100 may also contain communication connections 116 that allow it to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term computer readable media as used herein includes both storage media and communication media.

Embodiments of the present disclosure can be used to design logical IC chips capable of being fabricated using processes and apparatus known in the art. For example, once a router has been stress tested and reconfigured according to the methodologies described above, the IC fabrication process can be accomplished by using the router to fabricate patterned masks, which are then used to manufacture the semiconductor device by implementing a desired logical design in and on a semiconductor substrate.

The presently disclosed embodiments will be appreciated to reduce design cycle iterations by providing DPT-compliant pattern-based solutions with reduced odd cycle decomposition errors. Furthermore, the presently disclosed embodiments will be appreciated to increase yield and reduces costs of manufacturing by feeding back exposed decomposition errors into the router processing engine during router development and processing software modification and reconfiguration.

Figure 2:
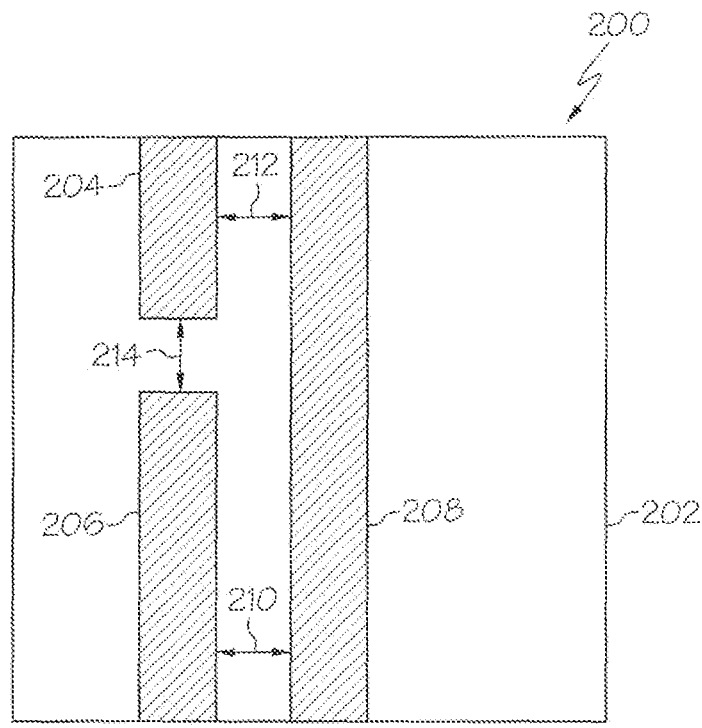
FIG. 2 is a schematic diagram of an exemplary single pattern design layout illustrating three microelectronic structures exposing an odd cycle error.

Referring to FIG. 2, a portion of an IC design 200 includes a pattern 202 which is supposed to be decomposed into two masks. The pattern includes a first microelectronic structure 204, a second microelectronic structure 206, and a third microelectronic structure 208. The opposing tips of respective structures 204, 206 are separated by a distance 214; the opposing sides of respective structures 204, 208 are separated by a distance 212; and the opposing sides of respective structures 206, 208 are separated by a distance 210. In the example illustrated in FIG. 2, distances 210 and 212 are equal.

If the distance 214 is smaller than the same mask tip-to-tip rule and the distance 210 and 212 are smaller than the same mask side-to-side rule, the pattern 202 cannot be manufactured by using two masks and, instead, three masks are required. This example shows a simplest odd cycle structure.

If the distance 214 is greater than the tip-to-tip critical dimension defined by the same mask (same color) rules for the technology implementing the IC design, the pattern 202 can be split in a way that pattern 204 and 206 are manufactured by one mask and pattern 208 can be manufactured by a second mask.

While it is possible to resolve either the tip-to-tip color rule violation between structures 204 and 206, or the side-to-side color rule violation between structure 208 and one or both of structures 204, 206 by decomposing pattern 202 into two separate patterns (i.e., through double patterning techniques), it is not possible to resolve all three potential color rule violations using standard DPT techniques. More generally, given three polygons (or other microelectronic structures) A, B, and C lying in a plane, if the minimum distance between each pair of structures (that is, between A and B; between B and C; and between A and C) is less than a critical dimension defined by an applicable same color rule, an odd cycle condition exists which is not resolvable using conventional DPT techniques and, hence, the corresponding device layout is not manufacturable unless the odd cycle condition is further decomposed into at least one additional metal layer.

Due to the substantial manufacturing costs and delays associated with mitigating color rule violations, it is important to expose color rule violations, and particularly odd cycle errors, early in the design phase. It is therefore desirable to increase the robustness of a DPT compliant router, particularly with regard to the router's ability to detect and expose odd cycles in the course of rendering or generating drawn layouts from input IC design data files.

Figure 3:
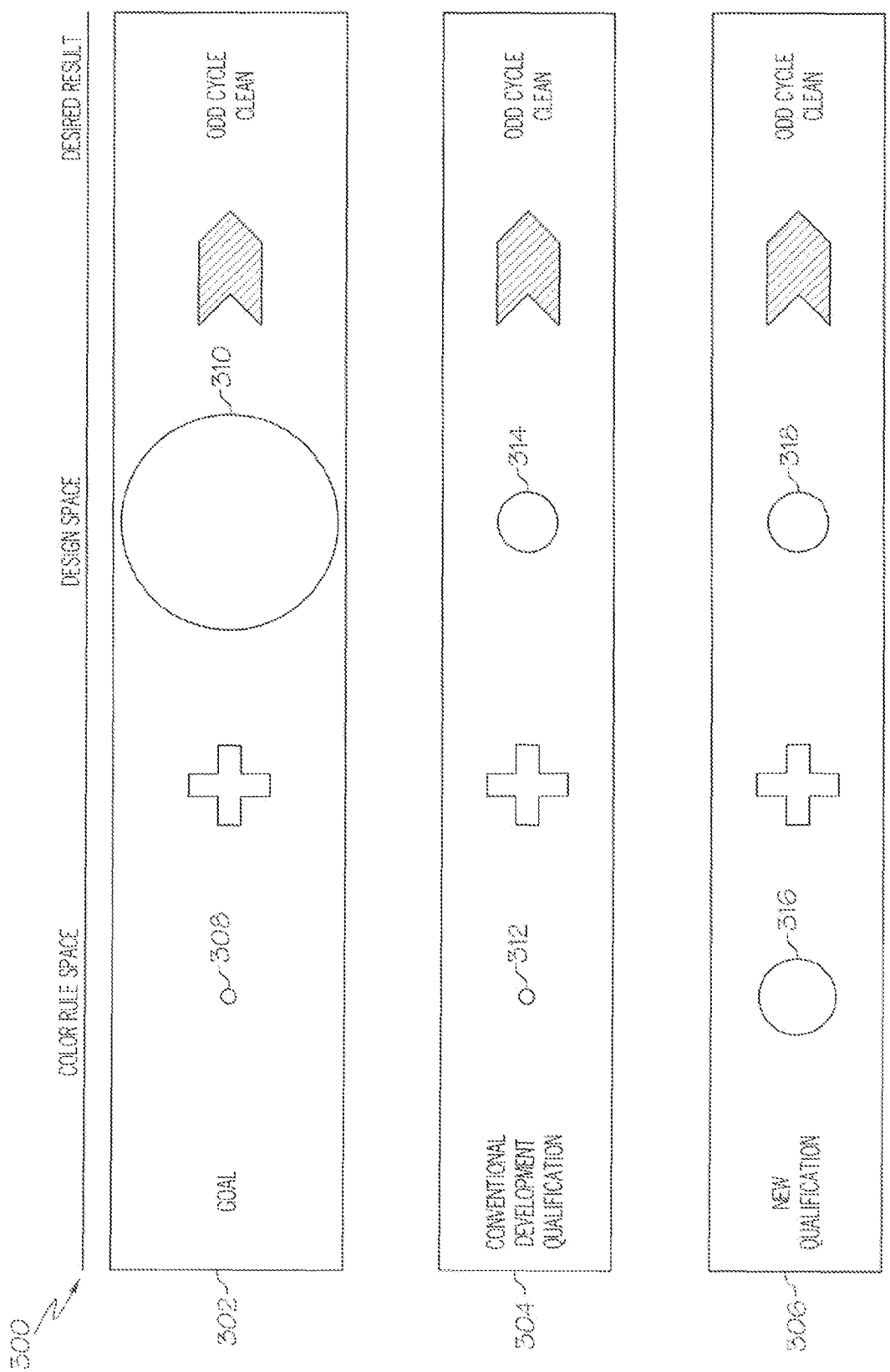
FIG. 3 is a table which conceptually illustrates the application of various color rule spaces to various design spaces.

FIG. 3 is a conceptual drawing which generally illustrates the three conceptual approaches to stress testing, or qualifying, a router for subsequent use in identifying and exposing odd cycle errors. In each case, a set of color rules defining a color rule space is mapped with, or otherwise processed with, one or more test designs which define a design space. The size of each circle represents the range of designs or same color (mask) rules.

A first line 302 illustrates the theoretical goal of a completely robust processing system, in which a particular set of color rules yields zero odd cycles (also called an "odd cycle clean" condition) for all possible input designs. More particularly, line 302 proposes a first color rule space 308 combined with a first design space 310. First color rule space 308 represents a one dimensional set of color rules; that is, color rule space 308 may include a complete set of color rules (tip-to-tip (T2T), tip-to-side (T2S), side-to-side (S2S), and the like) wherein each individual color rule within the space is associated with a single numeric value (such as, by way of non-limiting example, a side-to-side critical dimension of "66 nanometers"). In this regard, first color rule space 308 is said to be "one dimensional" in that each color rule within the space has one, and only one, value. In order to achieve an odd cycle clean result for first color rule space 308, it is necessary that first design space 310 contemplate all or nearly all possible combinations of design patterns and features. As a practical matter it is neither desirable nor feasible to construct or implement such a design space.

Accordingly, conventional development qualification processes employ the conceptual model embodied in a second line 304 of FIG. 3. More particularly, line 304 proposes combining a second color rule space 312 with a second design space 314. In the illustrated example, second color rule space is conceptually equivalent to first color rule space 308, and is thus one dimensional. Second design space 314 is composed of a predetermined set of designs of the type typically encountered during production.

That is, the set of designs that make up design space 314 are selected to provide a reasonable approximation of the type and extent of designs which the router would encounter during normal, everyday operation. In this way, by exposing odd cycles during the development and qualification phases of router deployment, the decomposition errors may be used as feedback to the router's processing system, to thereby increase the number and variety of design conflicts (color rule violations) which the router can subsequently resolve during day-to-day operation. A typical second design space 314 may begin with as few as five to ten designs. During development and/or qualification, the robustness of the router may be enhanced by the foregoing feedback process, increasing the number of designs contemplated by second design space 314 to several dozen or even several hundred or more separate designs, as desired. In this regard, it should be noted that only a limited (although potentially large) number of designs, and not all designs, can be considered by this technique.

In accordance with an embodiment of the present disclosure, a third line 306 proposes combining a third color rule space 316 and a third design space 318. As shown, third design space 318 is conceptually similar to second design space 314. However, third color rule space 316 is qualitatively and quantitatively different from first and second color rule spaces 308 and 312 in that third color rule space 316 is two (and possible higher order) dimensional. In this regard, third color rule space may begin as an original one dimensional color rule space, and subsequently expanded using perturbation.

More particularly, perturbing a single dimension color rule space involves extrapolating a respective critical dimension value for each rule within the color rule space to include one or additional values. Such perturbed values may include values which successively increase (e.g., in regular or nonlinear increments or intervals) above the critical value, successively decrease (e.g., in regular or nonlinear increments or intervals) below the critical value, or both. By way of non-limiting example, if a particular color rule critical dimension is expressed as 66 nanometers, the corresponding perturbed values for that color rule may include one or a range of values less than 66 (e.g., 64, 62, and so on) as well as one or more values greater than 66 (e.g., 68, 70, and so on). The range of perturbed values is referred to herein as the perturbation zone, and may be selected to achieve a desired balance between robustness, on the one hand, and computational cost and complexity, on the other hand.

With continued reference to line 306 of FIG. 3, the use of a perturbed color rule space 316 in conjunction with a properly configured design space 318 allows the router to expose a greater number and variety of odd cycles than would otherwise be possible using a conventional (unperturbed) color rule space. Consequently, the resulting robustness of the router is commensurately increased.

Figures 4, 5:
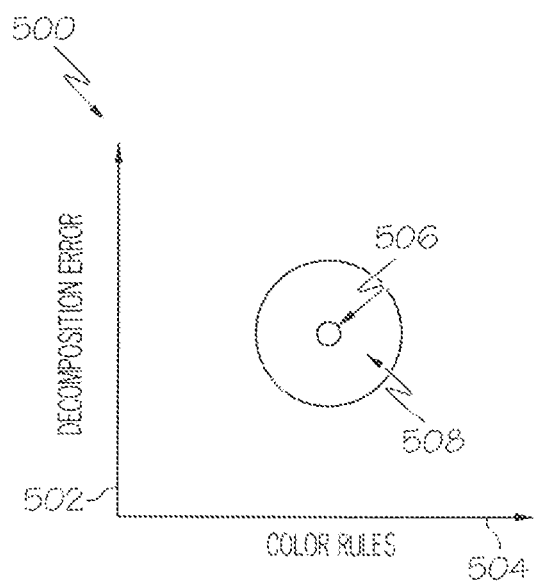
FIG. 4 is a table setting forth an example of color rule perturbation for an original color rule target value and represents a portion of the data graphically depicted if FIG. 5.
FIG. 5 is a graphical illustration of a perturbation zone surrounding an original color rule.

FIG. 4 is a tabular representation of the effects of perturbation on the resulting number of exposed odd cycles on adjacent double patterning routing metal layers M2 and M3 for an original side-to-side and tip-to-tip color rule combination. In particular, table 400 includes a horizontal axis 402 representing a first color rule (side-to-side or S2S in the illustrated embodiment), and a vertical axis 404 corresponding to a second color rule (tip-to-tip or T2T). it will be appreciated, however, that one, two (as shown), or any number of color rules may be perturbed and simultaneously processed and/or graphically displayed in accordance with the present disclosure. As described in greater detail below, perturbing and analyzing more than one color rule within a color rule may reveal the sensitivity of one perturbed color rule vis-à-vis another color rule or rules.

With continued reference to FIG. 4, the original color rules under investigation correspond to an S2S critical dimension of 62 nm (horizontal axis) and a T2T critical dimension of 62 nm (vertical axis). Using the conventional development qualification discussed above in connection with line 304 of FIG. 3, the router processing engine exposed that number decomposition errors shown in error field 406 (expressed as "0/1"), namely, zero odd cycles in metal layer M2 and only 1 odd cycle in metal layer M3. In order to enhance the robustness of the double patterning router under stress test, that is, the router being qualified and/or reconfigured in accordance with the perturbation methods disclosed herein, the qualification approach proposed herein may be employed.

More particularly and with continued reference to FIG. 4, perturbing the target value (i.e., the critical dimension of the original S2S color rule) of 66 nm in both directions yields perturbed S2S values of 60, 64, and so on for as long as the extrapolation is extended. In similar fashion, the original target T2T value of 62 nm is also perturbed in both directions, although it will be understood that either or both target values may be perturbed in one or both directions in accordance with various embodiments. By processing a zone of preturbated values in addition to processing the original target value of one or more color rules, a greater number of occurrences of odd cycles are exposed. Moreover, when these decomposition errors are fed back into the router's processing engine and mitigated or otherwise resolved during qualification, development, and/or reconfiguration of the router, its robustness i.e., its ability to expose odd cycles) is concomitantly increased.

Referring again to FIG. 4, it is evident that a perturbed color rule space exposes more odd cycles than an unperturbed color rule space. For example, the perturbed T2T color rule value of 64 nm, combined with the perturbed S2S color rule value of 60 nm, revealed five (5) decomposition errors in metal layer M2 and eight (8) decomposition errors in metal layer M3.

It will also be appreciated that the patterns of odd cycles may also vary when the color rules are disturbed. For example, implementing a smaller T2T same color (mask) rule in the router can lead to more narrow tip-to-tip structures that cannot be resolved by two mask technology. Similarly, implementing a smaller S2S same color (mask) rule in the router can lead to more tight pitches that cannot be decomposed into two masks.

Turning now to FIG. 5, a plot of a decomposition error space is shown for a target color rule value as well as for a perturbation zone surrounding the color rule value. In particular, a plot 500 includes a vertical axis 502 corresponding to a decomposition error space, and a horizontal axis 504 corresponding to color rule values. As shown, an original target rule 506 produces a relatively small, one dimensional decomposition error space. In contrast, a perturbed color rule zone 508 yields a correspondingly larger decomposition error space. As discussed above, the decomposition error space can include one, two, or higher order fields containing numerical data representing the number of exposed odd cycles for the original and perturbed color rule values. The numerical value (s) of the individual decomposition error fields is a function of the actual original and perturbed color rule values, as well as the configuration of the associated design rule space, as tabulated, for example, in FIG. 4.

Figure 6:
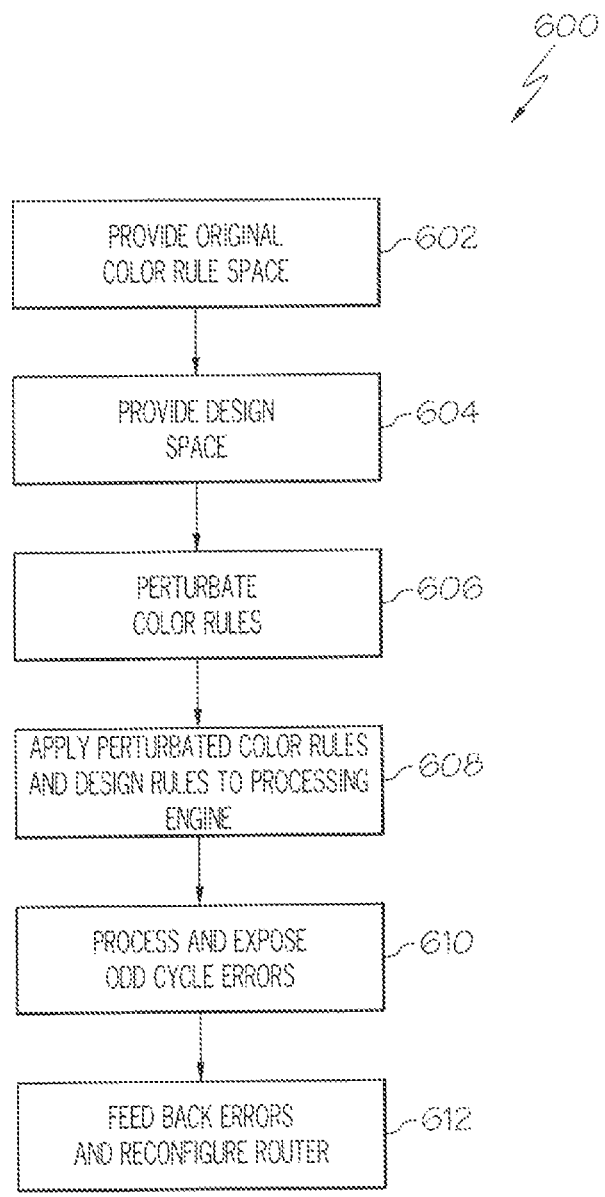
FIG. 6 is a process flow diagram of an exemplary method of increasing the robustness of a router through color rule perturbation during router development.

Referring now to FIG. 6, a router development method 600 for increasing the robustness of a double patterning router used in the manufacture of integrated circuit devices includes providing (task 602) a set of original color rules defining an original color rule space; providing (task 604) a set of integrated circuit (IC) test designs defining a design space; perturbing (task 606) the original color rules to define a perturbed color rule space; applying (task 608) the perturbed color rule space and the design space to a router processing engine; processing (task 610) the perturbed color rule space and the design space to expose double pattern routing odd cycle decomposition errors; and feeding back (task 612) the decomposition errors to the router processing engine and reconfiguring the router processing engine in accordance with the decomposition errors.

Figure 7:
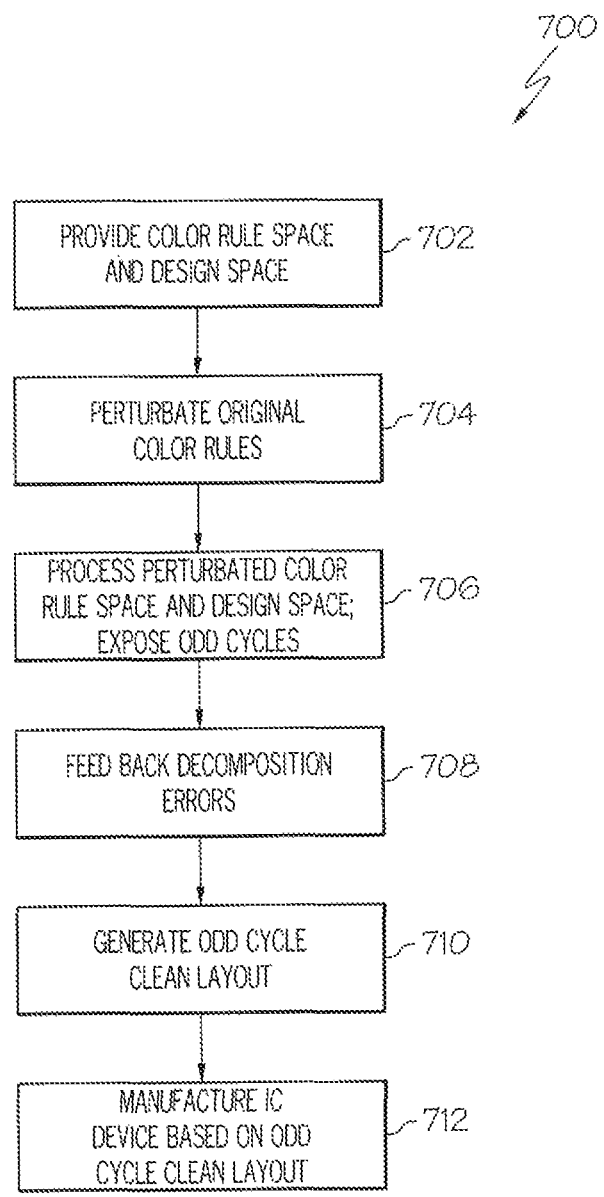
FIG. 7 is a process flow diagram of an exemplary method of router qualification in foundries in accordance with the present disclosure.

Referring now to FIG. 7, a method 700 for router qualification in foundries (or, alternatively, a method for fabricating an integrated circuit device using a double patterning router) includes providing (task 702) a set of original color rules defining an original color rule space and a set of integrated circuit designs defining a design space; perturbing (task 704) the original color rules to define a perturbed color rule space; processing (task 706) the perturbed color rule space and the design space to expose double pattern routing odd cycle decomposition errors; feeding back (task 708) the decomposition errors and reconfiguring the router to correct or otherwise mitigate the decomposition errors. A router that is able to generate zero odd cycles in task 706 is said to be "qualified" as double patterning compliant. If the conventional router specifications relating to speed, timing results, and the like are also satisfied, the router can then be used by foundries to create (task 710) physical design layouts for use in manufacturing (task 710) customer IC designs.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. In a method for manufacturing integrated circuit devices using a double patterning router having a processing engine including the steps of providing original same mask color rules associated with a plurality of values, and providing a set of integrated circuit (IC) test designs defining a design space; the improvement comprising increasing the robustness of the double patterning router by:
   perturbing said original same mask color rules to define perturbed same mask color rules associated with a plurality of expanded values, wherein the plurality of expanded values are expanded from the plurality of values associated with the original same mask color rules, and wherein the perturbed same mask color rules define a perturbed color rule space;
   applying said perturbed color rule space and said design space to said router processing engine; and
   processing said perturbed color rule space and said design space to expose double pattern routing odd cycle decomposition errors.

2. The method of claim 1, further comprising feeding back said decomposition errors to said processing engine.

3. The method of claim 2, further comprising reconfiguring said processing engine in accordance with said odd cycle decomposition errors.

4. The method of claim 3, wherein reconfiguring comprises revising said software to resolve said decomposition errors.

5. The method of claim 1, wherein providing said set of IC test designs comprises providing at least one predetermined logical design for an integrated circuit.

6. The method of claim 5, wherein providing at least one predetermined logical design comprises providing a logical design which does not include any physical structures.

7. The method of claim 5, wherein providing at least one predetermined logical design comprises providing a logical design that includes a plurality of patterns.

8. The method of claim 1, wherein processing comprises identifying at least one non-double patterning technology (DPT) compliant pattern.

9. The method of claim 1, wherein providing the original same mask color rules associated with the plurality of values comprises providing a target critical value for at least one of a: side-to-side dimension; tip-to-side dimension; and tip-to-tip dimension.

10. The method of claim 9, wherein perturbing comprises, for each one of said target critical values, providing the plurality of expanded values which are at least one of: successively incrementally larger and successively incrementally smaller than said target critical value.

11. The method of claim 10, wherein providing said target critical values comprises providing each target critical value expressed in integer values of nanometer units.

12. The method of claim 11, wherein providing said plurality of expanded values comprises providing expanded values that are both greater than and less than said target critical value.

13. The method of claim 12, wherein perturbing said original same mask color rules to define perturbed same mask color rules associated with a plurality of expanded values comprises providing expanded values expressed in successive increments of two integers.

14. The method of claim 1, wherein the processing engine comprises a computer processor and associated software configured to implement the function of an electronic design automation tool.

15. The method of claim 1, further comprising:
   generating, using said double patterning router, a design layout which does not include odd cycle decomposition errors.

16. The method of claim 15, further comprising manufacturing an integrated circuit device based on said design layout.

17. In a method for fabricating an integrated circuit device using a double patterning router, the method including the steps of providing original color rules associated with a plurality of values and defining an original color rule space, and providing a set of integrated circuit designs defining a design space, the improvement comprising:
   perturbing said original color rule space to define a perturbed color rule space which includes a plurality of expanded values, wherein the plurality of expanded values are expanded from the plurality of value;
   processing, using said double patterning router, said perturbed color rule space and said design space to expose double pattern routing odd cycle decomposition errors;
   feeding back said decomposition errors to said router;
   reconfiguring said router to correct said decomposition errors;
   generating a design layout which does not include said odd cycle decomposition errors; and
   manufacturing an integrated circuit device based on said design layout.

18. The method of claim 17, further comprising:
   generating, using the reconfigured router, an odd cycle clean patterned mask.

* * * * *